Patented Jan. 9, 1945

2,367,166

UNITED STATES PATENT OFFICE 2,367,166

LACTEAL-LAXATIVE PRODUCTS AND PROCESS OF MAKING SAME

Clyde C. Balston, Interlachen, Fla.

No Drawing. Application May 11, 1939,
Serial No. 273,127

17 Claims. (Cl. 167—56)

This application is a continuation-in-part of my application Serial No. 119,885, filed January 9, 1937, which in turn is a continuation-in-part of my application Serial No. 690,112, filed September 19, 1933.

Explanation of the respective terms used herein will be found at the end of the specification.

The objects of my invention are primarily to produce:

Laxative food products comprising laxative, etc., material and lacteal material—also process for making such products.

Palatable emulsified lacteal-laxative products comprised of lacteal material or materials, and one or more oils in any desired effective quantity and ratios having the ability to cause different and approximately predetermined degrees of laxative, cathartic, purgative, evacuative and/or lubricating actions in the digestive tract, ranging from effective mild or regulatory effects up to and including strong and powerful actions therein—and to render said oil or oils stable in said products.

To combine and emulsify castor oil and mineral oil together in any desired effective quantity in combination with lacteal material or materials, and to render said oils stable with relation to each other and in the products thereof.

To combine with castor oil and/or mineral oil other oil or oils having the ability to produce effective laxative action.

To combine emollient material with either of said products.

To mask or at least largely overcome, the objectionable taste and/or the natural free fluid oiliness of laxative oil or oils, and, particularly To mask, or to at least largely overcome the objectionable nauseating taste and gagginess of castor oil; also the thick oily consistency and tenaciousness thereof in the mouth.

To produce by the use of such oil or oils laxative, etc., products, including ice creams, or frozen, or solidified, lacteal confections, of which a personal or individually consumable small quantity portion of either thereof shall, as commonly eaten, be capable of producing such desired laxative, etc. (and/or emollient), effects.

To produce highly laxative dairy products and particularly laxative butters—natural and/or synthetic—in order to enable them to be used effectively as laxative, etc., spreads on foods.

To produce soft, and/or custard or curd-like, laxative-lacteal products—also laxative-lacteal beverage products.

To render said oil and/or oils stable with relation to each other and/or lacteal material composing the said products, even when they may become soft, or (for beverage purposes), melted down into a fluid condition—and/or diluted with water or carbonated liquid.

To render said products of agreeable flavor.

To emulsify castor oil and mineral oil.

The use of castor oil for most effectively producing laxative, etc., effects in the digestive tract is well known, but due to its aforesaid disagreeable characteristics, most people find it very difficult, and even nauseating to take.

Therefore, the eliminating or masking of such objectionable features of castor oil (and of the other laxative oil or oils) in a good tasting confection or food product is most desirable.

Many methods have been devised to disguise the unpleasant characteristics of castor oil, such, e. g., as mixing it with skim milk and reducing the mixture by heat to a powder and then making medicinal pellets thereof; also by pouring the oil into liquid substances, such as fluid goat's milk, and flavoring it with essence of orange blossoms, or with cloves, etc., and then rapidly agitating it. Such fluid unsolidified mixtures must, however, be drunk at once, since the oil is not thereby made stable therein, and promptly separates from such milk in large globules that rise and spread over the surface thereof, when its aforesaid objectionable taste characteristics are still strongly evident. Furthermore, none of such expedient preparations produce palatable laxative, etc., food or confection products that can be made, stored, shipped and kept in stable condition, as trade commodities, or for later home consumption.

Beside castor oil, many people object to and even find nauseating, the natural oily feel, taste or consistency and effect of other laxative oil or oils, such e. g., as mineral oil when taken alone.

I have found, however, that when castor oil alone, or with another laxative, etc., oil or oils, is finely combined with solidifying or solidified lacteal material, and emulsified therewith or therein and an appropriate chemical agent (which may be a flavoring material) corresponding in strength or quantitive ratio, and in increased strength and quantity to the strength and quantity, and increased strength and quantity, of said oil or oils, is incorporated therewith and the product frozen, the objectionable taste of said castor oil becomes practically tasteless or largely overcome in such products, and has lost its aforesaid objectionable characteristics to the average person; said conditions apply also, to laxative, etc., butters, curds, cheese, and the beverages named herein; and when such product is frozen (and in the case of the lacteal solid butterfat, is solidified) the oil or oils become congealed and frozen, and become fixed and permanently stable with relation to each other and to the lacteal material (and this pertains also to either of said oils when emulsified separately or combined and frozen in a product—and to such extent that the characteristic taste and the natural free oiliness and oily feel thereof in the mouth becomes fully, or at least largely, overcome); so that even when such a product is allowed to become soft, or melted down into fluid state, and has been diluted with water or carbonated beverage, such oil or oils have lost most or all of their natural free oiliness or taste; thereby rendering said products homogeneous, palatable and permanently stable, and from which the oil or oils as the case may be, never separate.

Standard methods of making trade ice creams, etc., and ordinary and special methods of making home or cabinet ice creams, etc., and other dairy products, are too well known to need detailed description.

I do not therefore limit the making of my products to any particular mix or processing method thereof; since the said laxative, etc., oil or oils may be combined, processed, emulsified and stabilized with any suitable lacteal material or preparation, in different ways and at the most economical stages of the processing.

My invention consists primarily in combining one or more laxative, etc., oil or oils and/or other materials, with lacteal material or materials, mix, or lacteal preparation, either in their fluid, semi-solidified, solidified, congealing, freezing, or frozen state, and in intimately mixing, blending, or emulsifying such laxative materials together and with the aforesaid respective lacteal materials, to form laxative-lacteal products, and flavoring the products, also incorporating and mixing with said materials or products, a chemical agent or agents capable of masking or assisting in masking objectionable taste characteristics of such laxative, etc., materials (e. g., that of castor oil)—and of solidifying the mixtures, and in the case of ice creams, hard freezing the products—and in the case of the softer lacteal solids, such as whipped or beaten whipping, heavy, or churning creams, whipped butters, butters, curds, etc., of sufficiently solidifying them at refrigerating but non-freezing (or if desired at freezing) temperatures, also producing laxative beverage products, each in stabilized and homogeneous state.

In the preparation of my products, the materials, and their proportions, ratios, quantities, temperatures and processing, the amount of oil or oils, the chemical agent, or acidulous or other flavoring agent for assisting in masking the taste characteristics of the oil or oils, the sweetening, the percentage of water or other liquid content, and the solids and ingredients and state thereof, including the percentages and ratios thereof, may each and all be used and altered and adjusted as desired to suit the requirements of the respective processing and products, to produce the best, most economical, palatable, homogeneous, and most stable laxative, etc., lacteal food products.

To the mixes of the following enumerated formulas I have added from 10% up to 30% of laxative, etc., oils, to serve as samples of mild but effective dosage quantities thereof intended for popular or average laxative and lubricating dosage purposes, together with a chemical agent (which, as indicated, may also impart flavoring to the products), varying from 2% up to 2.75% (which agent differs in quantity and purpose from flavoring matter that is used in ice creams for the mere matter of imparting a particular taste to the lacteal materials thereof) the quantity of which chemical agent it will be seen increases in direct proportionate ratio to the increased quantity of the e. g. castor oil added to or forming part of the formulas, for the purpose of assisting, with the freezing, in masking the objectionable taste of the progressively increased quantities of the (mainly) castor oil—and may assist in masking normal oiliness thereof in the products during the solidifying and congealing of the lacteal materials, and of said oil or oils; it being understood that neither said formulas, nor any lacteal material, or any mix, or the product of either thereof, is restricted to the quantity of oil or oils expressed in either of said formulas, except for the specific reason of causing the popular or average laxative, etc., dosage effects heretofore stated; and that quantities of such or other usable oil or oils, singly or together, may range from below 10% up to major and, in certain cases and products up to even high major quantities thereof, and up to the saturation point thereof, and of the lacteal material of a product, including up to the high point beyond which the taste characteristics of said castor oil, and other oil or oils, cannot be well masked or at least largely overcome—also the free natural oiliness thereof; and that the percentage of the chemical agent (and of any efficient chemical agent), may be added and increased in strength or quantity approximately proportionate to the increased strength or quantity of the oil or oils, and up to whatever amount desired above the aforesaid 2.75%, for the purposes herein expressed; and that in place of, or in addition to, the mineral oil, an equivalent amount of an emollient (e. g., glycerin), may be incorporated, which serves to increase the laxative effect of the castor oil, and adds a healing property to the product, contrary to the action of the mineral oil which tends to lubricate and tone down the too strong action of the castor oil—also, suitable amount of solvent to assist in effecting the emulsification of said oil or oils together, and of either or both thereof with the lacteal material.

Following are some samples, for the purpose stated, of satisfactory formulas, although as aforesaid, the materials thereof may be greatly varied therefrom, and produce satisfactory results, as long as milk and/or cream is the principal element thereof.

(The parts of formulas Nos. 1 and 2 are given by weight.)

(1)

| | Parts |
|---|---|
| Heavy cream | 135 |
| Milk | 1,000 |
| Sugar | 245 |
| Egg or egg white | 60 |
| Castor oil | 160 |

Flavoring to suit.

(2)

| | | |
|---|---|---|
| Cream | parts | 830 |
| Milk | do | 260 |
| Sugar | do | 300 |
| Butterfat | per cent | 18 |
| Castor oil | parts | 160 |

Fruit juices or flavoring extract, to suit.

Thickening agents (such as gelatin, gum karaya or tragacanth), if desired, 10 to 15 parts.

(3)

| | |
|---|---|
| Sugar | per cent 15.00 |
| Gelatin | .40 |
| Egg yolk (dry) | .75 |
| Condensed milk | 28.00 |
| Butter | per cent 14.30 |
| Water | 41.55 |
| Butterfat | per cent 12.00 |

(10% to 15% castor oil, plus up to 7½% of mineral oil, added. Flavoring matter up to 2¼% added.)

(4)

| | Per cent |
|---|---|
| Sugar | 15.00 |
| Gelatin | .40 |
| Eggs | 10.72 |
| Evaporated milk | 42.00 |
| Cream | 26.10 |
| Milk | 5.78 |
| Butterfat | 14.00 |

(12% to 15% castor oil, plus up to 8% mineral oil, added. Flavoring matter up to 2¼% added.)

(5)

| | Per cent |
|---|---|
| Sugar | 15.00 |
| Gelatin | .30 |
| Skim powder | 2.10 |
| Cream | 48.90 |
| Milk | 33.70 |
| Butterfat | 16.00 |

(15% to 18% castor oil, plus up to 9% mineral oil, added. Flavoring matter up to about 2½% added.)

(6)

| | Per cent |
|---|---|
| Sugar | 15.00 |
| Gelatin | .30 |
| Egg yolk | .50 |
| Plain cond. milk | 9.70 |
| Cream | 45.00 |
| Skim milk | 29.50 |
| Butterfat | 18.00 |

(15% to over 20% of castor oil, plus up to 10% or more of mineral oil, added. Flavoring matter up to about 2½% added.)

(7)

| Ingredients: | Pounds |
|---|---|
| Sugar | 6.75 |
| Gelatin | .18 |
| Egg yolk (fresh) | .45 |
| Cream | 22.50 |
| Skim milk | 15.12 |
| Butterfat | 20.00 |

(15% to over 20% of castor oil, plus 10% or more mineral oil, added. Flavoring matter up to about 2¾% added.)

The percentages of "butterfat" expressed after the lacteal materials of Formulas Nos. 2 to 7, inclusive, represent the amount of butterfat of the lacteal materials of the respective formulas—but in Formula No. 3, "butter" itself (in addition to the expressed percentage of "butterfat"), is included directly as one of the parts or elements of said formula, the "butterfat" being expressed thereafter separately, as in the other formulas.

*Home-made ice cream*

The contents of formulas therefor vary considerably.

The following one is given as representative therefor in relative proportions:

(8)

| | |
|---|---|
| Heavy cream | pint ¼ |
| Milk, B grade | do ½ |
| Sugar | oz 2¼ |
| Egg (beaten) | ½ |

(Castor oil 10% to 15%, added. Flavoring matter up to 2¼%, added.)

It will be noted that the oil or oils added to the formulas, although shown as minor in percentage or quantity with relation to the whole mix of each thereof, are major in quantity to the lacteal solid butterfat thereof—which is expressed separately in all of said formulas—and shown also in relation to the quantity of said oil or oils.

If desired a small amount of croton oil may be used as a laxative or cathartic in a product, alone or with another oil or oils.

An amount of cascara or other laxative or purgative, etc., material may be used or added to a product to cause stronger laxative or cathartic, etc., action.

In order to prepare a product to produce a mild, average laxative dosage effect by the eating, say, of a single popular sized 4-ounce portion thereof (i. e., of ice cream), I combine and emulsify with the whole bulk or mass quantity of the lacteal material or mix, such quantity of castor oil and/or mineral oil that preferably each 4-ounce popular service or counter portion thereof will have about ¾ of an ounce of castor oil (equalling about 1½ tablespoonfuls) with preferably ⅜ ounce (equalling ¾ of a tablespoonful) of mineral oil, and about ¾ to one dram (equalling about from ¾ to one teaspoonful) of a chemical agent to assist in masking the taste, etc., characteristics of said oil. Instead of the mineral oil an amount of glycerin may be used.

A "portion" may, however, be larger or smaller than said 4-ounces, and the quantity of castor oil and/or other oil or oils may be larger for even such mild average effect; and other of my ice cream products and lacteal products may be comprised of very large and even major quantities of such oils, and particularly butter, curds, etc., which may be comprised of high major quantities thereof, emulsified, solidified, stabilized and rendered palatable therewith; on the other hand very high major percentages or quantities of said laxative, etc., oil or oils may be combined and emulsified with ice creams, etc., so that an individually consumable portion thereof, smaller than said 4-ounces, may be rendered highly laxative, and in which the objectionable oil taste characteristics may be well masked or largely overcome—to provide concentrated, smaller types of laxative lacteal product "portions" intended for convenient home storage and use and of a size to fit the freezing compartments of automatic refrigerators.

This pertains especially, too, to lacteal material, preparations or products thereof, having a high percentage of the lacteal solid butterfat, and therefore to butters themselves—also to synthetic butters, and mixtures of said butters in any efficient ratios, since castor oil and/or other laxative oil or oils—including lubricating, and certain vegetable oils—readily combine and emulsify together and with lacteal solids and/or with synthetic butters, in my processing of the products composed thereof.

Dairy products, such as ordinary and whipped butters, and butterfat, and the lacteal solids or components thereof, comprising whipped or beaten whipping, heavy, or churning creams—natural or synthetic—and combinations thereof, curds, cheese, etc., when intimately combined or emulsified with large amounts of castor and/or other laxative, etc., oil or oils, and materials, can be used as spreads on food, to form laxative or regulatory products, and with such products can be combined a chemical agent, such as fruit or vegetable materials, juices, or components (and alcoholic or non-alcoholic extracts thereof), such e. g. as lemon, vanilla, strawberry, pineapple, peach, etc., also a small amount of sweet cascara or other laxative ingredients, and other suitable flavoring or chemical materials (natural or synthetic) either with or without vanilla, citric or tartaric acid or other chemical agents.

I have found that hard frozen laxative oil or oils can be finely divided by shaving, pulverizing, etc., into a condition resembling snow, and in such comminuted state mixed with lacteal material (e. g., congealed ice cream, etc.).

Furthermore, since castor oil and other laxative oils as aforesaid thicken and become semi-hard or hard when subjected to freezing temperature, it or they may be used as stiffening agents in the products. Moreover, castor oil renders ice cream smoother and richer.

Gelatin, gums, flour and other stiffening or stabilizing agents and special preparations may be used for such purpose in each of the products hereof.

In producing my products I prefer that the lacteal materials or mix may be first prepared and processed in the usual way up to the solidifying, congealing or semi-frozen but workable state of the mass, and the oil or oils be added, either separately or together, and in bulk form, into the congealed lacteal material or mix, in the freezing machine (or as the solidified or semi-frozen mass is drawn therefrom), and to introduce the required amount of chemical (or flavoring) agent therewith, and emulsify the whole mass together, and thereafter hard-freeze the mixture in the usual way into marketable condition for the particular products—or the lacteal material or mix may be processed and hard-frozen in the usual way and then later withdrawn from the hardening room and allowed to warm up and soften to a semi-frozen, workable condition, and the oil or oils, and the chemical (or flavoring) agent, be added, mixed and emulsified therewith, and the product be then again hard-frozen.

Prepared lacteal mixes may be used that require little stirring, and it may be possible by the use of chemical or other agent, to cause the combining and emulsifying of castor and/or other laxative oils in and with lacteal material or mix, without the use of mechanical or manual mixing (that is to solidify, congeal or freeze such mixtures, and to cause swell therein by gas formed therein), and such methods are within the scope of my invention—also any method that will give proper and efficient laxative-lacteal products for the purposes hereof.

When ice cream containing certain quantities of laxative oil or oils (and particularly castor oil), softens, or stands for some time, it thickens and serves the purpose of a laxative, etc., soft thickened substance, which may be eaten. With other percentages of such oil or oils, it forms when melted, a fluid substance that may be used in that state as a beverage or may be diluted by the addition of milk, or plain or carbonated water up to over 20% of its volume, to serve as a laxative beverage.

In either the softened or the fluid states, such ice creams and allied products may be bottled and preserved, and stored for a long time, if kept properly cooled.

Laxative oil or oils when mixed with the lacteal solid butterfat, such as whipping, heavy, or churning cream, from which the water content is largely absent, form a stable product of sufficient solidity when chilled or stabilized to serve as spreads on food.

A usual dosage portion of the products herein generally produces an easy mild laxative, etc., action of the bowels, generally free from internal discomfort and after-constipation, which often follows when natural fluid castor oil is taken in the usual way.

To summarize:

(a) Castor oil combines and emulsifies readily and thoroughly with solidified or congealed lacteal materials, alone or in combination with another oil (e. g., medicinal mineral oil, liquid petrolatum and/or croton oil, etc., and/or glycerin) either in the different ordinary ice cream mixes or in congealed, or frozen ice creams, or in solidified or semi-frozen lacteal materials, and other dairy products. "It" in the following paragraphs, "b" to "j" means one or more of the oils mentioned.

(b) It does not adversely affect the overrun or "swell" of a product, and causes a richer and smoother product than ordinary (non-custard) ice creams, preserves the lacteal materials and products, and it may replace in certain preparations, a part of the milk solid or butterfat.

(c) It becomes thickened, stiff, or congealed, or hard, in near-freezing or freezing temperatures, digests readily in the digestive tract, and appears to add a certain amount of sweetness to the lacteal materials or products, and may therefore, permit the use of a lesser quantity of sugar or other sweetening agent.

(d) Its glycerin content—also such percentage of glycerin as may be added to it—has a healing effect in the bowels—the glycerin combining readily with the lacteal materials.

(e) It combines and emulsifies finely in large volume and up to the saturation point, when solidified or congealed with lacteal materials, and also lessens the tendency to excessive formation of ice crystals in an ice cream mix or product, and may be agreeably flavored in combination with such materials or products, with different flavoring matters.

(f) It becomes stable in the respective lacteal material products hereof, and does not thereafter separate therefrom.

(g) It loses, permanently, for all practical purposes hereof, all its disagreeable taste, gagginess and oily feel in the mouth when emulsified and congealed, solidified, or frozen, with lacteal material or with the products hereof.

(h) Its objectionable taste and characteristics do not return when such materials or products become soft and melted.

(i) It and the other oils referred to herein combine and emulsify and become stable in natural and/or synthetic butters, and in mixtures thereof.

(j) It does not lose its effective laxative or cathartic, etc., efficiency by being processed as herein stated.

(k) It provides, in combination with lacteal materials from mild to strong laxative or cathartic, etc., affects, as desired, without ordinarily producing after-constipation, and may be taken in moderate or average dosage amounts day after day, as an excellent bowel regulator—its action being generally easy and without griping, and without causing seepage; in fact, in some cases, it produces regular healthy evacuation of the bowels for many days after the taking of the last dose quantity thereof.

(*l*) Castor oil and/or mineral oil or other laxative, etc., oil or oils, may take the place of a portion of the butterfat of a product.

When a well agitated fluid ice cream mix or fluid lacteal material comprising the usual quantity of water as a component is subjected to freezing temperature, the water content thereof first freezes in innumerable minute crystals. Thereupon the castor, mineral, and/or other usable oils are free to combine together in the presence of and with the lacteal solids. In the case of butter, itself, however, the voluminous water content of its milk and fluid cream components has already been mostly squeezed out in the process of making the butter, and so leaves it free (as a lacteal solid) to combine and emulsify with such oil or oils.

My invention provides the most pleasant method yet devised of taking castor and other laxative, etc., oils, in combining them with a pleasant tasting food product, which stimulates the natural peristaltic action of the bowels, and also provides valuable vitamins through the use of considerable amounts of fruit, or fruit or vegetable juices, etc.

Applicant admits, however, that he does not know the exact chemistry thereof, or of the other results stated herein—including to what extent the chemical (or flavoring) agent, combined with the solidifying and/or freezing of a product acts to mask the objectionable taste of the oil or oils, the exact cause of the permanent stabilizing thereof with each other and, the masking of the natural free oiliness of the oils in the products. The following defining terms (as well as definitions used in other places of the specification to the extent that they can respectively apply) are intended to cover and define the terms used in the claims hereof.

The term "lacteal material" means one or more thereof, and is intended to include milk and/or cream, and their components, including curds, butter, butterfat, cheese, ice cream mixes and products, and substitutes for milk and/or cream—also mixtures thereof.

The terms "laxative oil, laxative, etc., oil or oils, laxative material or materials" are intended to mean castor oil, mineral oil and/or petrolatum in whatever usable state thereof, croton oil, and each and all kinds of laxative, cathartic, purgative, evacuative, and/or lubricating oil or oils, and/or glycerin, including any oil or oils (and mixtures of either of them) having the ability to cause definite or effective actions in the digestive tract, ranging variously from regulatory or mild up to pronounced or stronger, and strong laxative, etc., action therein (either with or without a solvent, glycerin and/or other emollient or healing material) and each usable separately or together, and emulsified in any desired, practicable, minor, equal, or major quantities or strength, and in whatsoever practicable percentage or ratio with relation to one another and to the lacteal material or materials, or to the respective solidified or frozen, etc., products thereof.

The above terms cover bland oils when used in sufficiently large quantity to produce effective action.

The foregoing terms cover also cascara, or other laxative, purgative, etc., ingredients usable with my oleaginous products.

The term "laxative" as used herein includes each and all kinds of laxative, lubricating, cathartic, purgative, and evacuating materials usable for the objects of this invention.

The term "mineral oil" includes medicinal mineral oil, and petrolatum of a grade usable for the objects hereof.

The term "mix" is used to cover any material or materials, which, when solidified or frozen may produce laxative, etc., products.

The term "ice cream" is used to cover all types of ice creams and frozen confections, whether of "commercial," "home," or "special" make—including frozen custards, mousses, etc.—and all frozen, semi-frozen, and de-frozen, softened, or melted lacteal products.

The term "solvent" is used to include each and all kinds of chemical or other solvents, methods, or agents which may act or assist in acting as a solvent or solvents for castor oil and/or other laxative oils usable for the purposes hereof. The terms emulsion, emulsified, amalgamated, blending, or intimately mixed or blended, are used to cover the emulsifying or blending together of laxative, etc., one or more oils (and/or an emollient and/or laxative material or materials therewith), and in or with any lacteal material or materials or mixtures or products thereof, in whatever fluid, natural, or partly or semi-solidified, solidified, semi-frozen or hard frozen state thereof.

The term "fixing, stiffening, stable, or stabilizing, and/or agent" (beside gelatin and the well known materials commonly used therefor) covers castor oil itself, and/or one or more other oil or oils that may stiffen, solidify, congeal, or become hard in the products hereof.

The term "frozen or freezing" is intended to cover respectively solidified, congealed, partly frozen, or hard-frozen states of lacteal material or materials, oil or oils, ice cream, etc., as well as said products—also, the usual non-frozen but solidified consistency and states of butter, curd, and cheese, and the different near-freezing or the cold preserving refrigerating conditions thereof.

The term "emollient" means glycerin and/or any other material having soothing or healing properties.

The term "chemical agent," or acidulous flavoring agent, or flavoring matter or material, means any agent or material (but preferably of acidulous nature including all usable fruit or vegetable materials, and juices or extracts thereof, either alcoholic or non-alcoholic, natural or synthetic, such, e. g., as are named herein, and whether of an acidulous nature or not, and with or without citric, tartaric or other acids, capable of masking or assisting in masking the objectionable taste characteristics of laxative, etc., oil or oils and/or materials, and especially that of castor oil (and possibly the free or natural oiliness and oily feel in the mouth of such oils), when used in sufficient quantity or strength in the respective products hereof.

The above chemical agent, etc., terms, covers also the use of alkaline materials or agents for masking or assisting in masking the taste.

The term "saturation point" indicates the highest point or stage at which the greatest amount of any laxative, etc., oil or oils and lacteal material or materials, or the products thereof, may combine together and become stable with relation to each other—also, the point beyond which the objectionable taste characteristics of laxative, etc., oil or oils, and particularly castor oil, and/or the free, natural oily feel in the mouth of either thereof, cannot be masked or at least largely overcome to the taste of the average person.

The term butter or butterfat, means besides ordinary and whipped butters and the usual non-frozen states thereof, the lacteal components or solids thereof, such as whipped or beaten whipping, heavy, or churning creams—natural or synthetic—and the semi-solid or near "whipped butter" state, and the more solid but non-frozen state of butter (as well as the near or frozen states thereof), and covers also combinations of such natural or synthetic lacteal materials.

What I therefore claim is:

1. A laxative product comprising laxative oil and lacteal material intimately blended and frozen together.

2. A laxative product comprising a lacteal material having a laxative oil finely blended and frozen therewith.

3. A laxative product comprising lacteal material, laxative oil, and medicinal mineral oil intimately blended and frozen.

4. A lacteal material containing castor oil emulsified and frozen therewith.

5. A laxative product comprising lacteal material, castor oil, and medicinal mineral oil intimately blended and frozen together.

6. Lacteal material and castor oil intimately blended and frozen together, and an aciduluous flavoring agent combined therewith to assist in masking the taste of said oil.

7. A process which comprises at least partly freezing a lacteal material, separately freezing a laxative oil, intimately mixing such two materials together while each is in an at least partly frozen state and thereafter freezing the mixture.

8. An ice cream mix containing a lacteal material as a component, carrying castor oil emulsified in said ice cream, said castor oil being held in emulsion in said product by freezing, and said product being free from castor oil taste and being free from the greasy feel in the mouth characteristic of castor oil.

9. A method of getting rid of the objectionable characteristic taste, flavor and gagginess of normal fluid castor oil to be used as a medicine, which comprises emulsifying the said oil in an ice cream mix, and freezing the mixture.

10. A laxative product of soft thickened consistency, composed of lacteal material and laxative oil combined and frozen together, said product being produced by thereafter softening the combination.

11. A laxative beverage made by melting a frozen combination of lacteal material and laxative oil.

12. A laxative beverage made by melting and diluting a frozen combination of lacteal material and laxative oil.

13. A process which comprises the steps of well mixing together laxative oil and lacteal material while the latter is in a partly frozen but soft condition, and thereafter freezing the mixture.

14. A process which comprises the step of well mixing together laxative oil in effective laxative quantity and lacteal material, while one of said materials is in partly frozen but workable condition, and thereafter freezing the mixture.

15. A process which comprises well mixing together castor oil and an ice cream material in a partly frozen but soft condition, and thereafter freezing the mixture.

16. A process which comprises thoroughly mixing together and freezing together lacteal material and at least about 10% of castor oil, into a homogeneous mass which is stable and edible and which is substantially free from the taste of said castor oil.

17. An ice cream containing a lacteal material, carrying a laxative oil held in emulsion therein by being frozen therewith, the product being substantially free from the disagreeable properties of such oil in its normal condition alone, and having the pleasant taste of ice cream.

CLYDE C. BALSTON.